July 22, 1969  U. ADAMS  3,456,378

FISHING DEVICE

Filed Dec. 7, 1966

INVENTOR.
UL ADAMS
BY Shanley & O'Neil
ATTORNEYS

United States Patent Office 3,456,378
Patented July 22, 1969

3,456,378
FISHING DEVICE
Ul Adams, 1755 S. Fremont,
Springfield, Mo. 65804
Continuation-in-part of application Ser. No. 517,756,
Dec. 30, 1965. This application Dec. 7, 1966, Ser.
No. 599,823
Int. Cl. A01k 91/00, 85/00
U.S. Cl. 43—42.48          4 Claims

ABSTRACT OF THE DISCLOSURE

A fishing lure having a narrow horizontal cross sectional shape in side to side dimensions relative to the top to bottom dimensions. The lure also has a relatively wide blunt area at its front which slopes upwardly and backwardly from the forward end, a portion of which is submerged both while at rest and when moving through water. Because the center of gravity is spaced below the center of buoyancy, the lure is designed to lie on its side when floating on the surface of the water while at rest to give the appearance of an injured minnow and on retrieval to submerge and "swim" with a rolling, swinging and wriggling action.

Related patent application

The present application is a continuation-in-part of my application Ser. No. 517,756, filed Dec. 30, 1965, now abandoned.

Description of preferred embodiments

The present invention relates to a fishing lure, and more particularly a lure to be cast by a fisherman to a considerable distance and retrieved. The speed of retrieval being variable, the lure of the present invention will closely imitate the motions of an injured minnow or shad which will lie on its side on the surface when at rest, dart, roll and swing erratically or swim normally for a while.

The lure of the present invention performs, unlike any known lure, lying flat on the surface of the water when not being retrieved and moving into a submerged erect position, subject to roll, with the appearance of swimming realistically when pulled through the water.

It is an object, therefore, of the present invention to provide a combination floating and retrieval lure that, as it is being retrieved, "swims" realistically in imitation of an injured minnow, or the like, that is the natural food of certain game fish.

It is a further object to make a lure that will float on its side when not pulled through the water, yet will always "swim" in the normal "vertical" position, subject to roll, when pulled through the water, the "swimming" action being controllable by the fisherman pulling the lure at different speeds.

The present objectives are achieved by (1) design of the buoyancy of the material from which the lure is formed, (2) shaping the lure so that it floats on its side with its nose submerged when stationary in the water, (3) shaping the lure so that it moves into an upright position, subject to roll, when it is submerged, and (4) forming a blunt surface area on the front of the lure and above the nose with the leader attachment positioned in this blunt surface area so that when the lure is pulled through the water by means of the leader the blunt surface area, acting in conjunction with the remaining shape of the lure, will cause the lure to "swim" realistically.

Other and further objects and advantages will appear from the following specification taken with the accompanying drawings in which the characters of reference refer to similar parts, and in which.

Figure 1:
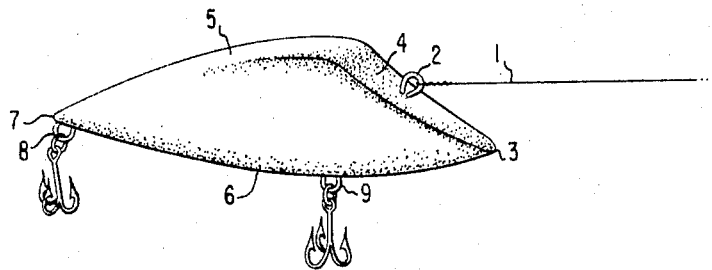
FIGURE 1 is a perspective view of a lure according to the invention.
Figure 2:
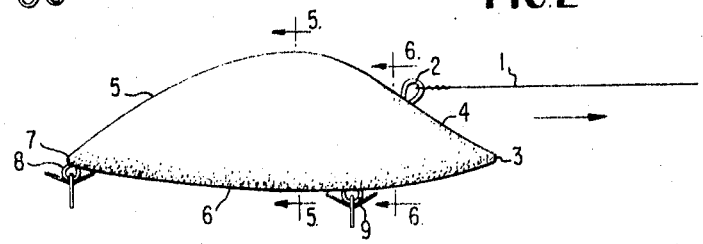
FIGURE 2 is a plan of the lure as it floats on the water.

FIGURE 1 shows the lure in the position it will assume when pulled through the water by fishing line or leader 1 that is connected to the lure by ring 2 near the front end. The ring 2 is located in a vertical plane which includes the longitudinal axis of the lure, the lure being symmetrical in shape with respect to this plane. In this position the front tip or prow 3 of the lure is below and forward of the ring 2 which is positioned part way up, within the center third of the inclined forward face or broad area 4 that slopes upwardly and rearwardly from prow 3 to merge at the top about one quarter to one half way along the length of the lure in a broadly rounded back 5 sloping from face 4 downwardly and rearwardly to the tail or rear 7. The lower part or belly of the lure extends from prow 3 in a substantially straight or slightly convex narrow belly or keel portion that joins the back 5 at the rear 7 of the lure at an acute angle. One or more hooks, or sets of hooks, are fastened at 8 and at 9 along the bottom, belly or keel of the lure.

Several important features of the lure are (1) the long, narrow in cross section, substantially straight or slightly convex keel carried the entire length of the lure, (2) the wider in cross section, rounded back, (3) the inclined blunt face or broad surface area above the nose, (4) the leader attachment above and rearwardly of the nose or prow 3 and in the vertical plane which includes the longitudinal axis of the lure, (5) the symmetry of the lure in respect to this same vertical plane, (6) a hook or hooks attached to or near the keel, and (7) the elimination of the necessity for internal ballasting or external scoops or deflectors (although they may be added, if desired).

Figure 3:
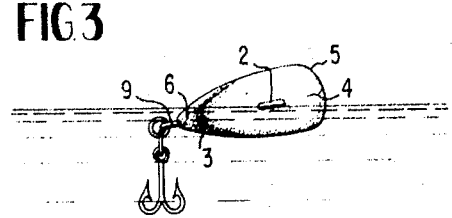
FIGURE 3 is an end view of the lure.
Figure 4:
FIGURE 4 is an edge view of the lure looking down on it in FIGURE 1.
Figure 5:
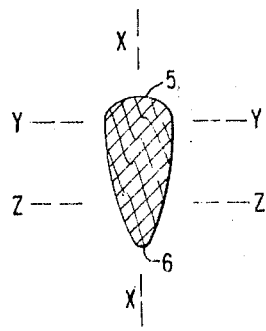
FIGURE 5 is a view in cross section taken at 5—5 of FIGURE 2.
Figure 6:
FIGURE 6 is a view in cross section taken at 6—6 of FIGURE 2.

The desired floating position of the lure, on its side with its nose submerged is achieved by an overall flatness in cross section as illustrated in FIGURE 5. In this figure, the dotted line X—X corresponds to the vertical plane referred to above which coincides with the longitudinal axis of the lure. The line Y—Y represents a horizontal plane passing through the widest dimension of the lure. It will be apparent that the cross sectional area of the lure intercepted by the plane X—X is very large compared with the cross sectional area of the lure intersected by plane Y—Y. This, taken with the overall buoyancy of the composition of the material from which the lure is formed, will cause the lure to float on its side. However, applicant's design is intended to do more than this; namely, the lure is designed to float with the nose 3 submerged. Applicant accomplishes this by shaping the cross section of the lure as illustrated in FIGURE 5 with a gradual taper so that a plane Z—Z is moving from the position of plane Y—Y down to the keel of the lure intersects increasingly smaller and smaller areas of the lure. As a result, the buoyancy of the lure at the keel, regardless of the weight of the hooks, is such that the keel is submerged at least at the nose 3. In other words, the center of gravity of the lure is below the center of buoyancy relative to the plane X—X in FIGURE 5. In this way the position of an injured minnow is assumed by the lure but at the same time the forward or lowermost portion 3 of the blunt or relatively wide area 4 is in submerged position so that a tug on the leader will cause the lure to start to submerge by the virtue of the action of the water moving across the face of blunt area 4. It will be apparent that the lure in FIGURE 3 will start to move to the left when tension is applied to the leader connection 2 and because of the angle of blunt area 4 and the position of ring 2, the lure will start to submerge.

The second important feature of applicant's design now comes into play as the lure submerges with the large buoyant portion in the neighborhood of that intersected by plane Y—Y causing the lure gradually to approach an upright position as the lure submerges. Thus, the lure now assumes the position of a normally swimming minnow. With the lure fully submerged, this buoyancy design of the lure will tend to maintain the lure more or less upright in the position shown in FIGURE 5 while the dynamic forces of the water acting on blunt face 4 will cause the lure to roll and swing with the motions of a swimming minnow.

Changing the position of ring 2 along the line of intersection of vertical plane X—X of broad area 4 will cause the lure to "swim" in a different manner. The closer the leader ring 2 is to point 3, within the limits which will cause submergence, the more stable will be the action of the lure, i.e., a very wide slow swing with the rolling action hardly noticeable. By the same token, the lure in such case would be less inclined to catch the eye of the prey. As the position of the leader ring is moved up this line, the rolling and swinging actions become faster, with the degree of swing reduced but not to degree of roll and with the roll thus becoming more apparent, until a critical point is reached. When this critical point is reached, the lure has trouble submerging and when it does submerge it acts in a very erratic fashion going off on a tangent first to one side then to the other. This is because the resultant force of the hydrodynamic forces acting on the lure as it is retrieved follows a straight line which passes through ring 2 and a point in the rear of the lure, at or in the neighborhood of rear end point 7. As pointed out in the preceding paragraph, the more buoyant portion in the region intersected by the plane Y—Y, with a homogenous material such as solid wood, gives a center of buoyancy for the lure above this resultant line of force, whereby the lure is maintained in the position of a normally swimming minnow. As the distance between the center of buoyancy of the lure and this resultant line of force becomes greater, i.e. as the ring 2 is positioned closer to point 3 in a modified lure, action of the lure is more stable with reduced rolling motion. As the resultant line of force approaches the center of buoyancy, i.e. the ring 2 is positioned higher in a modified lure, less righting action is present and the lure rolls more. The critical point is reached when the resultant line of force approaches, passes through or passes above the center of buoyancy. The foregoing theory is believed to be correct but whatever the correct theory, applicant's lure acts as described. Therefore, the leader ring 2 is preferably positioned in the blunt area 4 at a point on the line of intersection of the blunt area with vertical plane X—X somewhere in the center third of the distance between nose 3 and the uppermost extremity of the blunt area with the result that the lure has little swing motion but a very noticeable rolling motion.

It follows from all the above that applicant's lure with the leader ring positioned properly in the center third of the broad area 4 will perform like a swimming minnow with some swing, and very noticeable roll but when stationary, it will float on top of the water on its side like an injured minnow.

Changes of comparative length to the height of the lure changes the timing of the swing and/or roll.

Figure 7:
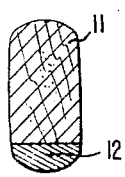
FIGURE 7 is a view in cross section similar to FIGURE 5 of a modification embodying the present invention.
Figure 8:
FIGURE 8 is a view in cross section similar to FIGURE 5 of a further modification of the present invention.

It will be apparent that many of the desired relationships of the present lure can be obtained with a different cross-sectional shape than that shown in FIGURE 5 by utilizing material which, unlike the wood is not substantially uniform in density. In such cases, the keel need not necessarily be narrow since greater relative buoyancy in the region of the Y—Y plane or more properly a lower center of gravity of the lure can be achieved by a weight along the keel or a localized cavity in the material of the lure. The former is shown at 12 in FIGURE 7 in connection with a wood body portion 11 and the latter at 14 in FIGURE 8 in connection with a plastic body portion 13. In both cases the structure affecting the center of gravity extends fore and aft of the vertical center line of the lure and is proportioned to position the center of gravity of the lure so that the lure lies on its side on the surface with the end 3 slightly submerged when at rest.

Having thus described my invention I claim:

1. A fishing lure comprising a body having a bottom longitudinal profile and an upper longitudinal profile, the upper and bottom longitudinal profiles joining at points at the front and back of the lure to form acute angles at these points, the distance between the longitudinal profiles increasing from the point at the back of the lure for a major portion of the length of the lure, the longitudinal cross sectional area of the lure in the vertical plane incorporating the upper and bottom profiles being appreciably greater than the greatest longitudinal cross sectional area of the lure in a horizontal plane, the horizontal cross sectional shape of the body of the lure being narrow in the side to side dimensions relative to the top to bottom dimensions, a relatively wide, blunt area at the front of the lure sloping upwardly and backwardly from the point at the front to a point on the upper profile at least one third of the way along the profile from the point at the front to the point at the back of the lure, the body being buoyant and having its center of gravity spaced a greater distance below the upper longitudinal profile than its center of buoyancy is spaced below the upper longitudinal profile so that the lure while at rest will float on its side in the water with at least a portion of the bottom profile and a portion of the blunt area contiguous to the point at the front submerged but will move toward an upright position in the water on submergence of the lure by the action of moving water on the blunt area when sufficient forward pulling force is exerted on the leader attaching means, and hook attachment means carried by the body of the lure rearwardly of the leader attachment means.

2. The fishing lure of claim 1 in which the cross sectional areas in successive horizontal planes from that of the greatest cross sectional area decrease toward the bottom profile.

3. The fishing lure of claim 2 in which the major portion of said upper profile is arched in cross section in a plane normal to the longitudinal axis of the lure and the entire length of said lower profile is V-shaped in such cross section.

4. The fishing lure of claim 1 in which the upper profile and the bottom profile fall in a common vertical plane and the lure is symmetrical in transverse cross-sectional shape with respect to the vertical plane.

References Cited

UNITED STATES PATENTS

| | | | |
|---|---|---|---|
| 2,038,127 | 4/1936 | Pflueger. | |
| 2,184,031 | 12/1939 | Wyatt | 43—42.48 X |
| 2,186,780 | 1/1940 | De Witt | 43—42.48 X |
| 2,314,907 | 3/1943 | Sweeney | 43—42.48 |
| 2,578,532 | 12/1951 | Forsberg | 43—42.48 |
| 2,938,293 | 5/1960 | Richardson | 43—42.48 X |
| 3,045,382 | 7/1962 | Watkins | 43—42.45 X |

SAMUEL KOREN, Primary Examiner

JAMES H. CZERWONKY, Assistant Examiner

U.S. Cl. X.R.

43—42.35, 42.39